US010589369B2

(12) United States Patent
Kimoto et al.

(10) Patent No.: US 10,589,369 B2
(45) Date of Patent: Mar. 17, 2020

(54) ELECTRODE WIRE FOR ELECTRICAL DISCHARGE MACHINING AND METHOD OF MANUFACTURING ELECTRODE WIRE FOR ELECTRICAL DISCHARGE MACHINING

(71) Applicants: OKI ELECTRIC CABLE CO., LTD., Kanagawa-Ken (JP); MITSUBISHI ELECTRIC CORPORATION, Tokyo (JP)

(72) Inventors: Yoichiro Kimoto, Kanagawa-Ken (JP); Yuji Miura, Kanagawa-Ken (JP); Yuki Hashimoto, Kanagawa-Ken (JP); Hengbo Su, Kanagawa-Ken (JP); Takayuki Nakagawa, Tokyo (JP); Yoshikazu Ukai, Tokyo (JP)

(73) Assignees: OKI ELECTRIC CABLE CO., LTD., Kanagawa-Ken (JP); MITSUBISHI ELECTRIC CORPORATION, Tokyo (JP)

( * ) Notice: Subject to any disclaimer, the term of this patent is extended or adjusted under 35 U.S.C. 154(b) by 335 days.

(21) Appl. No.: 15/522,068

(22) PCT Filed: Oct. 28, 2015

(86) PCT No.: PCT/JP2015/080447
§ 371 (c)(1),
(2) Date: Apr. 26, 2017

(87) PCT Pub. No.: WO2016/068209
PCT Pub. Date: May 6, 2016

(65) Prior Publication Data
US 2017/0320153 A1 Nov. 9, 2017

(30) Foreign Application Priority Data
Oct. 28, 2014 (JP) .................................. 2014-219424

(51) Int. Cl.
*B23H 1/04* (2006.01)
*B23H 7/08* (2006.01)
(Continued)

(52) U.S. Cl.
CPC ................ *B23H 7/08* (2013.01); *B21C 1/003* (2013.01); *B23H 1/06* (2013.01)

(58) Field of Classification Search
CPC .............. B23K 9/29–30; B23K 11/309; B23K 35/02–0294; B23K 35/288; B23K 35/302; B23H 1/04–06; B23H 7/08–108
See application file for complete search history.

(56) References Cited

U.S. PATENT DOCUMENTS 5,945,010 A    8/1999  Tomalin
6,794,597 B2 * 9/2004  Groos ...................... B23H 7/08
                                                   219/69.11
(Continued)

FOREIGN PATENT DOCUMENTS

CN    101115580 A    1/2008
CN    102239024 A    11/2011
(Continued)

OTHER PUBLICATIONS

First Office Action issued in Japanese Patent Appln. No. 2014-219424 dated May 15, 2018.
(Continued)

*Primary Examiner* — Michael A Laflame, Jr.
(74) *Attorney, Agent, or Firm* — Bacon & Thomas, PLLC

(57) ABSTRACT

To provide an electrode wire for electrical discharge machining including β-brass and γ-brass arranged on an outer peripheral surface of a core and a method of manufacturing the electrode wire, capable of enhancing wire connection performance and cutting down manufacturing cost while trying to increase a processing speed.

(Continued)

The electrode wire for electrical discharge machining according to this invention comprises: an external layer including β-brass and γ-brass; and a core having an undulating shape formed at a boundary surface with the external layer. The β-brass and the γ-brass are arranged densely and sparsely at the boundary surface of the undulating shape. The method of manufacturing an electrode wire for electrical discharge machining according to this invention comprises: a thermal processing step of executing thermal process on a base material under a predetermined thermal processing condition, the base material having a core with a zinc-coated surface; and a wire drawing step of drawing a base wire under a predetermined wire drawing condition provided with β-brass and γ-brass formed at the surface of the core by the thermal process to make the γ-brass reach the core, thereby forming a boundary surface of the core with an external layer into an undulating shape.

2 Claims, 5 Drawing Sheets

(51) Int. Cl.
    *B23K 35/02*     (2006.01)
    *B21C 1/00*     (2006.01)
    *B23H 1/06*     (2006.01)

(56) References Cited

U.S. PATENT DOCUMENTS 8,378,247 B2     2/2013    Blanc et al.

| | | | |
|---|---|---|---|
| 2003/0006873 A1* | 1/2003 | Weissbrod | B23H 7/08 336/221 |
| 2004/0060914 A1* | 4/2004 | Lee | B23K 35/0261 219/145.1 |
| 2006/0219666 A1 | 10/2006 | Shin | |
| 2008/0179296 A1 | 7/2008 | Ly et al. | |
| 2011/0290531 A1* | 12/2011 | Baumann | B23H 7/08 174/126.2 |
| 2012/0000889 A1 | 1/2012 | Hashizume et al. | |
| 2012/0273465 A1* | 11/2012 | Seong | B21C 1/003 219/69.15 |
| 2016/0368070 A1* | 12/2016 | Liang | B23H 7/24 |

FOREIGN PATENT DOCUMENTS

| | | |
|---|---|---|
| CN | 102369077 A | 3/2012 |
| FR | 2881974 A1 | 8/2006 |
| JP | 2002_126949 A | 5/2002 |
| JP | 2003_117732 A | 4/2003 |
| JP | 2003_175423 A | 6/2003 |
| JP | 2008_183704 A | 8/2008 |
| JP | 2008_535668 A | 9/2008 |
| JP | 2011_177882 A | 9/2011 |

OTHER PUBLICATIONS

First Office Action issued in corresponding Chinese Patent Appln. No. 201580059450.0 dated Jun. 5, 2018.
Office Action Issued in Corresponding Patent Appoln. No. 201580059450.0 dated Aug. 19, 2019.

* cited by examiner

ELECTRODE WIRE FOR ELECTRICAL DISCHARGE MACHINING AND METHOD OF MANUFACTURING ELECTRODE WIRE FOR ELECTRICAL DISCHARGE MACHINING

TECHNICAL FIELD

This invention relates to an electrode wire for electrical discharge machining and a method of manufacturing the electrode wire for electrical discharge machining. For example, this invention is applicable to an electrode wire for electrical discharge machining to be used for wire electrical discharge machining of processing a workpiece (processing target) by means of electrical discharge, and a method of manufacturing the electrode wire.

BACKGROUND ART

Wire electrical discharge machining is a processing technique of generating electrical discharge (arc discharge) between an electrode wire for electrical discharge machining (hereinafter called an electrode wire) and a workpiece and cutting the workpiece using heat energy resulting from the electrical discharge. Wire electrical discharge machining is particularly suitable for processing metal having a complicated shape such as a mold.

The aforementioned wire electrical discharge machining is required to satisfy the following: (a) a high processing speed; (b) a favorable finished condition of a surface of the workpiece and favorable dimension accuracy of the workpiece; (c) favorable positioning performance during measurement of a position of the electrode wire and that of the workpiece relative to each other; (d) a small amount of metallic powder to be caused while the electrode wire is moved continuously; (e) favorable wire connection performance during placement of the electrode wire on an electrical discharge machine; and (f) low cost.

Various studies have been conducted on the structure of the electrode wire. There has been an electrode wire made of single brass, for example. A higher zinc concentration in the composition of the electrode wire is generally known to increase a processing speed. However, if a zinc concentration in the electrode wire made of single brass is 40 wt % or more, for example, an intermetallic product having a body-centered cubic lattice is formed. This reduces ductility and toughness to make it difficult to execute cold wire drawing process. In this regard, there has been a wide-used conventional electrode wire made of single brass having a zinc concentration from 35 to 40 wt %, for example.

To increase a processing speed further, an electrode wire including a zinc layer formed only on a surface of the wire has been suggested. The electrode wire coated with the zinc layer may contribute to increase in a processing speed. However, zinc having a low boiling point is evaporated instantaneously during wire electrical discharge machining. This turns out to limit a processing speed.

There has also been a composite electrode wire formed by coating a brass core with zinc and then forming a β-brass layer by thermal process (thermal diffusion process). The electrode wire with the β-brass layer is given enhanced antiwear performance during electrical discharge machining. However, a sufficient processing speed cannot be achieved.

In consideration of the aforementioned problems, conventional techniques disclosed in patent document 1 to 4 have been developed.

Patent document 1 suggests a structure where an electrode wire core is coated with a γ-brass layer. Formation of this electrode wire is as follows. The γ-brass layer is formed by thermal process on a zinc-coated base wire. Then, the base wire is drawn to form fractured γ-brass on a surface of the electrode wire.

Patent document 2 discloses an electrode wire where a surface layer of a core of the electrode wire has a multilayer structure. In the electrode wire described in patent document 2, the surface layer of the core has an inner layer mainly formed of a β-brass layer and an outer layer mainly formed of a γ-brass layer. As described above, the electrode wire suggested in patent document 2 includes both β-brass and γ-brass arranged in an external layer of the core of the electrode wire.

Patent document 3 discloses an electrode wire including a stack of the following formed in an external layer of a core material of the electrode wire: a β-brass sublayer, and fractured γ-brass that reveals β-brass in a fracture. Gamma-brass is superior to β-brass in terms of electrical discharge performance, and γ-brass is superior to β-brass in terms of evaporation of zinc. Thus, in this electrode wire, β-brass exists after evaporation of γ-brass. Further, a high processing speed is achieved.

Patent document 4 discloses an electrode wire where a surface of an external layer (made of β-brass, for example) of a core material of the electrode wire is given a structure with projections and recesses, and the recesses are filled with a filler made of evaporable metal (γ-brass, for example).

CITED DOCUMENT

Patent Document

Patent Document 1: U.S. Pat. No. 5,945,010
Patent Document 2: Japanese Patent Application Laid-open No. 2003-117732
Patent Document 3: French Patent Application Publication No. 2881974
Patent Document 4: Japanese Patent Application Laid-open No. 2003-175423

SUMMARY OF INVENTION

Problem to be Solved by the Invention

As described above, the electrode wire including the β-brass layer and the γ-brass layer formed at the surface layer of the core can increase a processing speed. However, the external layer is given a large thickness. Hence, a problem of reducing wire connection performance is generally likely to occur. Additionally, as a result of many manufacturing processes, a problem of increasing manufacturing cost is also likely to occur.

Patent document 1 asserts that γ-brass is superior to β-brass in tenors of electrical discharge performance. However, like in the electrode wire including the zinc layer provided only on the surface of the electrode wire, instantaneous evaporation of γ-brass in the external layer is unavoidable to limit a processing speed. Hence, a problem of failing to achieve a sufficient processing speed is likely to occur.

Patent document 2 does not describe a method of manufacturing the electrode wire. However, forming γ-brass in the external layer without causing a crack requires maintaining a high temperature during the formation. Hence, the technique described in patent document 2 is likely to cause a problem of entailing high manufacturing cost.

According to the technique described in patent document 3, the β-brass layer and the γ-brass layer are stacked. This results in a large layer thickness of the electrode wire as a whole to cause a serious curl of the electrode wire resulting from winding around a bobbin to feed the electrode wire. Additionally, due to the large layer thickness, a tip shape strains during cutting of the electrode wire with an electrical discharge machine, causing a problem of reducing wire connection performance. This may be handled by reducing the entire layer thickness. However, reducing the layer thickness in turn causes a problem of reducing a speed.

The technique described in patent document 4 is expected to achieve a processing speed comparable to that of the electrode wire described in patent document 3. Meanwhile, the technique described in patent document 4 requires a step of forming the structure of the external layer and a step of filling γ-brass. Hence, the technique described in patent document 4 is likely to cause a problem of increasing manufacturing cost severely.

In view of the aforementioned problems, this invention is intended to provide an electrode wire for electrical discharge machining including β-brass and γ-brass arranged on an outer peripheral surface of a core and a method of manufacturing the electrode wire for electrical discharge machining, capable of enhancing wire connection performance and cutting down manufacturing cost while trying to increase a processing speed.

Means to Solve the Problems

To solve the aforementioned problems, an electrode wire for electrical discharge machining according to a first aspect of this invention comprises: (1) an external layer including β-brass and γ-brass; and (2) a core having an undulating shape formed at a boundary surface with the external layer. The β-brass and the γ-brass are arranged densely and sparsely at the boundary surface of the undulating shape.

An electrode wire for electrical discharge machining according to a second aspect of this invention is characterized in that, in the first aspect of this invention, the core has a cross-sectional peripheral length that is 1.2 times greater or more than a circumferential length of a perfect circle calculated based on an average outer diameter of the core.

A method of manufacturing an electrode wire for electrical discharge machining according to a third aspect of this invention comprises: (1) a thermal processing step of executing thermal process on a base material under a predetermined thermal processing condition, the base material having a core with a zinc-coated surface; and (2) a wire drawing step of drawing a base wire under a predetermined wire drawing condition provided with β-brass and γ-brass formed at the surface of the core by the thermal process to make the γ-brass reach the core, thereby forming a boundary surface of the core with an external layer into an undulating shape.

A method of manufacturing an electrode wire for electrical discharge machining according to a fourth aspect of this invention is characterized in that, in the third aspect of this invention, the thermal processing condition is determined in such a manner that a layer thickness of the β-brass has a ratio from 1.6 to 6.2% relative to the outer diameter of the base wire and a layer thickness of the γ-brass has a ratio from 0.4 to 4.7% relative to the outer diameter of the base wire.

A method of manufacturing an electrode wire for electrical discharge machining according to a fifth aspect of this invention is characterized in that, in the third or fourth aspect of this invention, the wire drawing condition is determined in such a manner that a cross-sectional decreasing rate is 80% or more.

Effect of the Invention

With a β-brass layer and a γ-brass layer arranged on an outer peripheral surface of a core, this invention is capable of enhancing wire connection performance and cutting down manufacturing cost while trying to increase a processing speed.

EMBODIMENTS OF THE INVENTION

Figure 1:
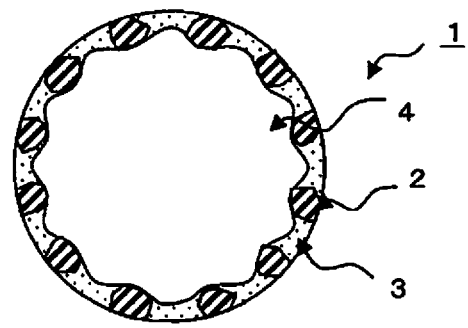
FIG. 1 is a sectional view showing the structure of an electrode wire according to an embodiment.

An embodiment of an electrode wire for electrical discharge machining and a method of manufacturing the electrode wire for electrical discharge machining according to this invention will be described below in detail by referring to the drawings.

According to the embodiment described in detail below, this invention is applied to an electrode wire for electrical discharge machining to be used for wire electrical discharge machining of processing a workpiece (processing target) by means of electrical discharge, and a method of manufacturing the electrode wire. A method of electrical discharge machining using the electrode wire for electrical discharge machining according to this invention will also be described.

FIG. 1 is a sectional view showing the structure of the electrode wire according to the embodiment. As illustrated in FIG. 1, an electrode wire 1 according to the embodiment includes a core 4, and β-brass 3 and γ-brass 2 arranged on an outer peripheral surface of the core 4.

For example, the core 4 of the electrode wire 1 can be formed by using copper, brass, etc. In the electrode wire 1, an external layer formed of the β-brass 3 and the γ-brass 2 are arranged on a brass core surface having an undulating shape fainted at a boundary surface of the core 4 with the external layer. The γ-brass 2 in the external layer is buried in the β-brass 3 and the γ-brass 2 is further buried in the core 4. In this way, the β-brass 3 and the γ-brass 2 are arranged densely and sparsely at a surface of the electrode wire 1. This structure maintains or increases a speed of process using the electrode wire 1. Further, the external layer can be formed into a small thickness to achieve enhancement of wire connection performance. Additionally, the electrode wire 1 can be provided at low cost.

The electrode wire 1 has an undulating shape at the boundary surface of the core 4 with the external layer. This makes it possible to avoid concentrated electrical discharge and to increase a processing speed, thereby achieving stable electrical discharge. The following describes principles of such electrical discharge by making comparison to a conventional electrode wire having a core surface coated with γ-brass.

Figure 3:
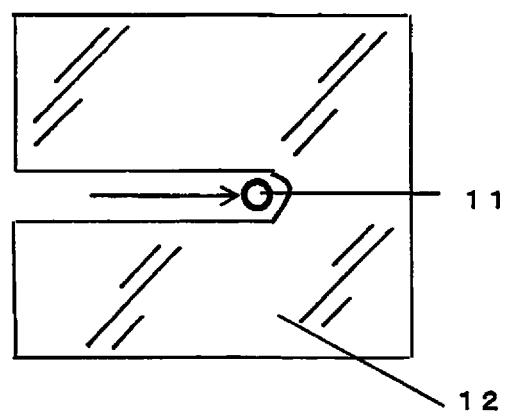
FIG. 3 is an explanatory view explaining a method of wire electrical discharge machining of cutting a workpiece using an electrode wire.
Figure 4:
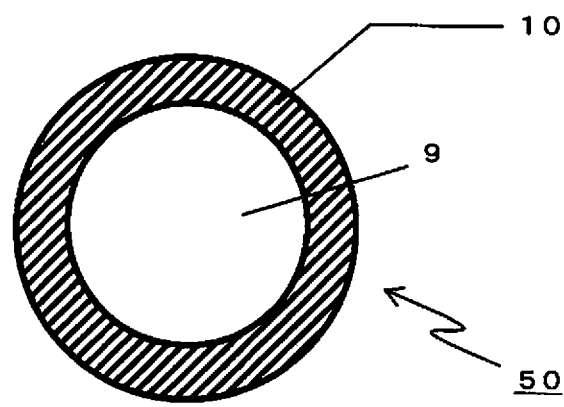
FIG. 4 is a sectional view showing the structure of a conventional electrode wire where a surface of a core is coated with γ-brass.
Figure 5:
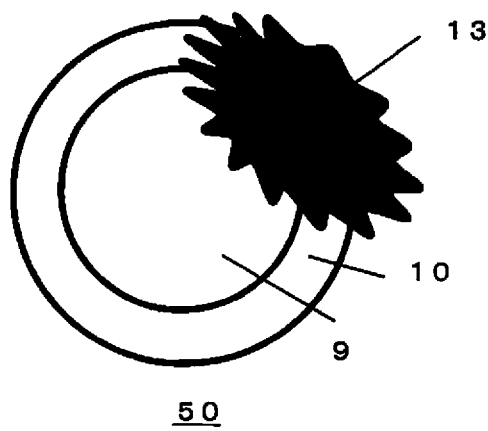
FIG. 5 is an explanatory view explaining concentrated electrical discharge occurring in the conventional electrode wire.
Figure 6:
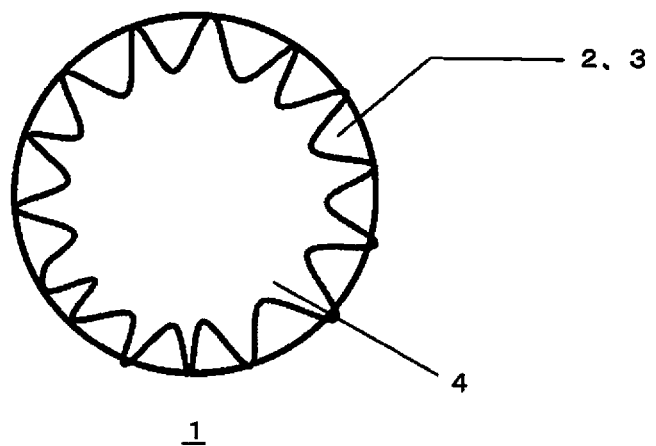
FIG. 6 is a sectional view showing an undulating shape of a core of the electrode wire according to the embodiment.
Figure 7:
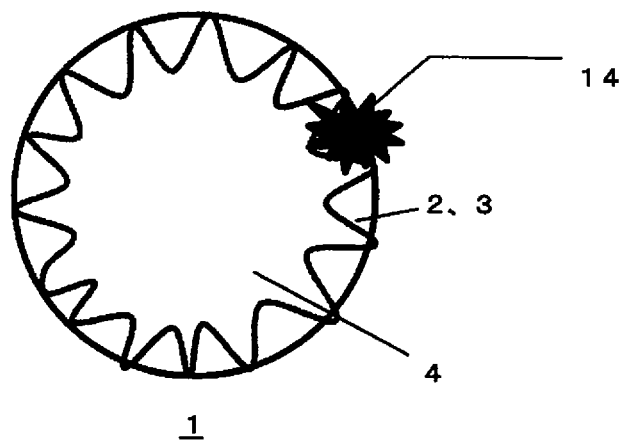
FIG. 7 is an explanatory view explaining concentrated electrical discharge occurring in the electrode wire according to the embodiment.

FIG. 3 is an explanatory view explaining a method of wire electrical discharge machining of cutting a workpiece using an electrode wire. FIG. 4 is a sectional view illustrating a conventional electrode wire 50 where a surface of a core 9 is coated with γ-brass 10. FIG. 5 is an explanatory view explaining concentrated electrical discharge occurring in the conventional electrode wire 50. FIG. 6 is a sectional view illustrating an undulating shape of the core of the electrode wire according to the embodiment. FIG. 7 is an explanatory view explaining concentrated electrical discharge occurring in the electrode wire according to the embodiment.

Referring to FIG. 3, for wire electrical discharge machining using an electrode wire 11, a workpiece 12 is cut by moving the electrode wire 11 in an arrow direction. At this time, electrical discharge is generated when the electrode wire 11 in the traveling direction and the workpiece 12 are at a smallest distance.

In terms of an actual electrical discharge phenomenon, as a result of a high zinc concentration, the conventional electrode wire 50 of FIG. 4 generates electrical discharge easily to increase a processing speed. This means the electrode wire 50 has good electrical discharge performance, so that concentrated electrical discharge 13 is likely to occur locally. Generating electrical discharge generates heat to melt the γ-brass 10. Meanwhile, the occurrence of concentrated electrical discharge generates heat locally and the core 9 is worn away deeply to its center due to the influence of the generated heat (see FIG. 5). This reduces tension at break of the electrode wire 50 to cause a break of the electrode wire 50 that is generally under tension of some degree. This phenomenon should be allowed for in establishing a processing condition. Thus, processing energy to be input should be limited to a degree that does not cause a break of the electrode wire 50 even on the occurrence of damage on the core 9. Hence, allowing for processing stability places a low limit on a processing speed.

By contrast, if the external layer including the γ-brass 2 and the β-brass 3 is formed while the boundary surface of the core 4 with the external layer is formed into an undulating shape as illustrated in FIG. 6, a portion with good electrical discharge performance does not extend continuously, making it possible to suppress the occurrence of concentrated electrical discharge 14 as illustrated in FIG. 7. Further, wear of the core 4 can be reduced to suppress reduction in tension at break of the electrode wire 1, making it possible to increase the quantity of processing energy to be input. To achieve this effect, the boundary line length of the core 4 having an undulating shape should be determined to be 1.2 times greater or more than a circumferential length of a perfect circle calculated based on an average outer diameter of the core 4.

To confirm the aforementioned idea, the inventors of this application checked a processing speed using electrode wires 1 in each of which the surface of the brass core 4 is coated with the γ-brass 2 and in which the condition of the boundary surface between the core 4 and the external layer differs between the electrode wires 1.

To check the condition of the boundary surface between the core 4 and the external layer (specifically, an undulating shape), the cross section of the electrode wire 1 was measured by measuring a boundary line length (hereinafter also called an undulating peripheral length) Lw of the core 4 and the cross-sectional area of the core 4 using "Digital microscope VHX-900, available from KEYENCE". A circumferential length Lc of a perfect circle (hereinafter also called an average circumferential length) was calculated by determining an average outer diameter of the core 4 using the cross-sectional area. Then, the condition of the boundary surface was expressed in terms of a ratio between Lw and Lc. Specifically, a larger value of Lw/Lc shows that the boundary surface between the core 4 and the external layer undulates to a greater degree.

A processing speed was evaluated using a wire electrical discharge machine SX10, available from Mitsubishi Electric Corporation. A workpiece used for the evaluation was made of a material SKD-11 of a thickness 50 mm. Table 1 shows a result of the evaluation.

TABLE 1

| Working Example | Lw/Lc | Processing Speed Ratio |
| --- | --- | --- |
| Working Example 11 | 1.00 | 100% |
| Working Example 12 | 1.14 | 101% |
| Working Example 13 | 1.27 | 104% |
| Working Example 14 | 1.33 | 107% |

Table 1 shows processing speeds relative to a processing speed according to Working Example 11 set at 100%. Referring to Table 1, increase in Lw/Lc, specifically, increase in the boundary line length Lw of the core 4 relative to the average circumferential length Lc of the perfect circle of the core 4 increase a processing speed. This shows that a processing speed is increased as the boundary line length of the core 4 increases as a result of an undulating shape of the boundary surface of the core 4 with the external layer. As understood from Table 1, the boundary line length of the core 4 being about 1.2 times greater or more than the average circumferential length Lc of the perfect circle of the core 4 (Lw/Lc being about 1.2 or more) is confirmed to increase a processing speed ratio remarkably. Thus, Lw/Lc is preferably about 1.2 or more.

A method of manufacturing the electrode wire 1 according to the embodiment will be described next. The method of manufacturing the electrode wire includes a zinc-plating step (first step), a thermal processing step (second step), and a wire drawing step (third step).

In the first step, the outside of a core made of a brass alloy is electroplated with zinc. As long as a surface of the core can be plated with zinc, a technique of the plating is not limited to electroplating but a different plating technique (hot-dip plating, for example) is applicable.

In the second step, the core plated with zinc is subjected to thermal process by being passed through a high-temperature electric furnace under a predetermined condition for the thermal process (temperature and time of the thermal process). In the high-temperature electric furnace, a β-brass layer is formed on a surface of α-brass. Next, a γ-brass layer is formed in an external layer of the β-brass layer (see FIG. 2).

In the third step, under cold wire drawing conditions a base wire (also called a base material) ejected from the high-temperature electric furnace is passed through a plurality of wire drawing dices sequentially each having an exit-side hole diameter smaller than an entrance-side hole diameter. In this way, a wire material is drawn to reduce the diameter of the wire material.

The aforementioned manufacturing method is not the only method of manufacturing the electrode wire but various manufacturing methods including at least the aforementioned first to third steps are applicable.

Principles of forming the boundary surface between the core 4 and the external layer into an undulating shape will be described next. Resistance to deformation of alloy metal resulting from plastic deformation of the metal during wire drawing process differs between phases. For example, α-brass having a face-centered cubic lattice has low resistance to deformation, whereas β-brass having a body-centered cubic lattice has large resistance to deformation. In the case of brass, resistance to deformation increases in the following order: α-phase, β-phase, and γ-phase. Gamma-brass is hardly deformed by wire drawing process.

Figure 2:
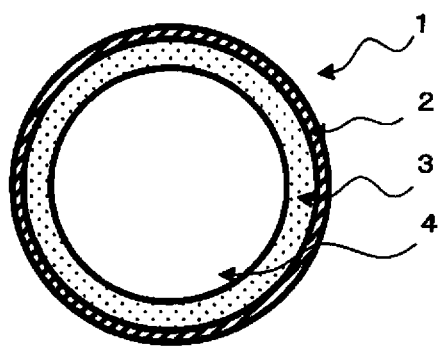
FIG. 2 is a sectional view showing the structure of a base wire (wire material) after execution of thermal process according to the embodiment.

As illustrated in FIG. 2, in the thermal processing step, the n-brass layer is formed on a surface of the α-brass. Next, the γ-brass layer is formed outside the β-brass layer. In the wire drawing step, the resultant wire material is drawn. Then, the γ-brass layer in the outermost layer of the wire material is broken first. Breaking the γ-brass layer in this way forms a portion where the γ-brass exists (γ-brass existing region) and a portion where the γ-brass does not exist (γ-brass non-existing region) in a superficial layer of the wire material.

Figure 8:
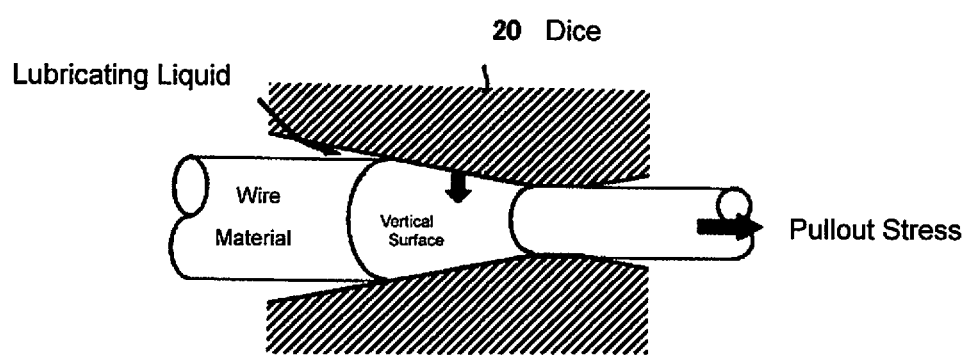
FIG. 8 is an explanatory view explaining wire drawing process according to the embodiment.
Figure 9:
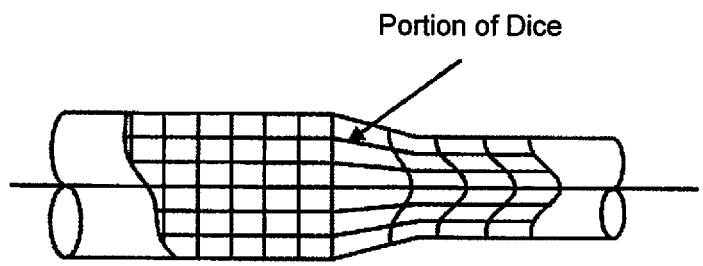
FIG. 9 is an explanatory view explaining force acting on a base wire during the wire drawing process according to the embodiment.

Force acting on the wire material in the wire drawing process will be considered next. FIG. 8 is an explanatory view explaining the wire drawing step. FIG. 9 is an explanatory view explaining force acting on the wire material during the wire drawing process.

As illustrated in FIG. 8, the wire drawing process is a step of putting the wire material into a wire drawing dice 20 of a conical shape where an exist hole diameter is smaller than an entrance hole diameter, and pulling the wire material through the exit side of the wire drawing dice 20. At this time, stress the wire material receives in the wire drawing dice 20 differs between the inside of the wire material and a superficial area of the wire material.

As illustrated in FIGS. 8 and 9, the superficial area of the wire material in the wire drawing step is restrained by the conical wire drawing dice 20 to generate large contact pressure acting in the vertical direction at a boundary between the wire drawing dice 20 and the wire material. By contrast, tensile stress is generated inside the wire material by the influence of pullout force (pulling force). Thus, in the presence of the β-brass layer and the γ-brass layer on the surface of the α-brass (see FIG. 2), the γ-brass layer in the outermost layer is broken by the contact pressure applied from the wire drawing dice 20 and the tensile stress. In this way, the portion where the γ-brass exists and the portion where the γ-brass does not exist are formed in stages.

By repeating the wire drawing step to apply the contact pressure acting in the vertical direction on the wire material restrained by the wire drawing dice 20, the broken γ-brass 2 is buried into the β-brass layer. This occurs for the reason that the γ-brass has higher hardness than the β-brass (specifically, the γ-brass is harder). At this time, the γ-brass is broken further to form a portion where the γ-brass is buried densely. Meanwhile, the superficial area of the wire material is given a portion where the γ-brass does not exist or a portion without the γ-brass resulting from falling out of the γ-brass from the β-brass. In this way, the γ-brass 2 is formed sparsely in the surface of the wire material.

If the wire material is drawn further, a portion with the densely arranged γ-brass 2 is made to protrude into the β-brass layer (see FIG. 2) thinned by the wire drawing. Then, the γ-brass 2 reaches the α-brass in the core 4 to be buried in the core (α-brass) 4. Along with this burial, a portion near the γ-brass 2 buried densely in the core (α-brass) 4 bulges relatively to form the boundary surface between the core 4 and the external layer into an undulating shape.

Finally, the β-brass 3 and the γ-brass 2 in the external layer of the core 4 are arranged densely and sparsely to form a brass core where the boundary surface of the core 4 with the external layer is formed into an undulating shape (see FIG. 1). As described above, the method of manufacturing the electrode wire 1 of the embodiment works effectively as it does not require a particular step such as cutting of the core (wire material). Thus, manufacturing cost can be cut down.

To support the principles of generating an undulating shape at the boundary surface with the external layer of the electrode wire 1, the inventors of this application conducted the following examination. First, zinc plating was applied to a thickness of 14 μm to an α-brass wire as a wire material having a base wire diameter of 0.9 mm. Then, using a common base wire left for 20 seconds in a high-temperature electric furnace at 800° C., wire materials were drawn under cold wire drawing conditions resulting in different cross-sectional decrease rates. Resultant cross sections of the wire materials were observed.

Figure 10:
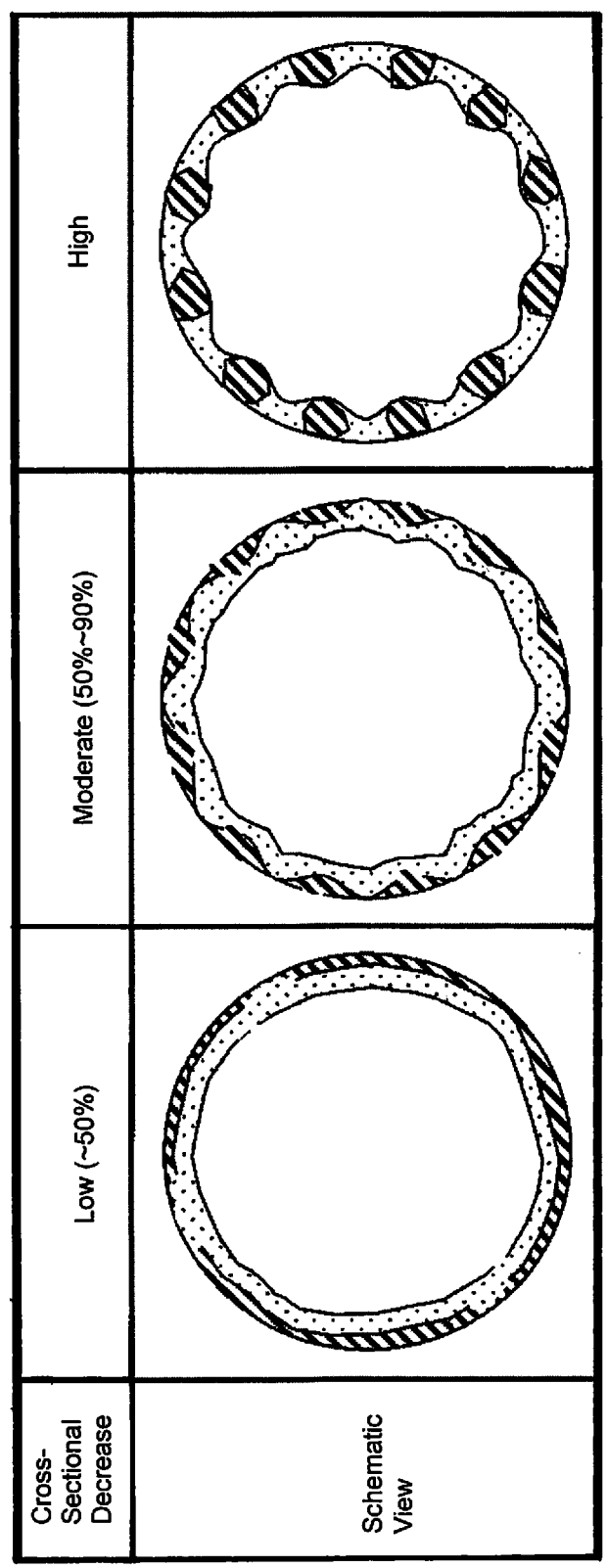
FIG. 10 is a sectional view showing the cross section of the base wire after execution of the wire drawing process according to the embodiment.

The thickness of the β-brass layer and that of the γ-brass layer in the base wire used in the wire drawing step were 35 μm and 15 μm respectively. FIG. 10 is a schematic view showing the cross section of the electrode wire after execution of the wire drawing process.

TABLE 2

| Working Example | Drawn Wire Diameter (mm) | Cross-Sectional Decrease Rate (%) | Average Circumferential Length Lc (μm) | Undulating Peripheral Length Lw (μm) | Lw/Lc |
| --- | --- | --- | --- | --- | --- |
| Working Example 21 | 0.821 | 22% | 2087.49 | 2229.47 | 1.07 |
| Working Example 22 | 0.749 | 35% | 1879.08 | 2014.46 | 1.07 |
| Working Example 23 | 0.684 | 46% | 1732.43 | 1893.82 | 1.09 |
| Working Example 24 | 0.624 | 55% | 1554.70 | 1718.01 | 1.11 |
| Working Example 25 | 0.569 | 62% | 1450.76 | 1640.68 | 1.13 |
| Working Example 26 | 0.519 | 69% | 1314.35 | 1501.77 | 1.14 |
| Working Example 27 | 0.474 | 74% | 1205.95 | 1405.55 | 1.17 |
| Working Example 28 | 0.434 | 78% | 1114.43 | 1351.74 | 1.21 |

TABLE 2-continued

| Working Example | Drawn Wire Diameter (mm) | Cross-Sectional Decrease Rate (%) | Average Circumferential Length Lc (μm) | Undulating Peripheral Length Lw (μm) | Lw/Lc |
|---|---|---|---|---|---|
| Working Example 29 | 0.395 | 82% | 1019.96 | 1256.31 | 1.23 |
| Working Example 30 | 0.362 | 85% | 946.39 | 1121.37 | 1.18 |
| Working Example 31 | 0.333 | 87% | 860.74 | 1048.62 | 1.22 |
| Working Example 32 | 0.308 | 89% | 803.02 | 979.41 | 1.22 |
| Working Example 33 | 0.287 | 90% | 756.53 | 952.38 | 1.26 |
| Working Example 34 | 0.267 | 92% | 703.98 | 882.60 | 1.25 |
| Working Example 35 | 0.248 | 93% | 650.46 | 894.08 | 1.37 |
| Working Example 36 | 0.231 | 94% | 603.55 | 798.00 | 1.32 |
| Working Example 37 | 0.200 | 95% | 548.33 | 763.89 | 1.39 |

Referring to Table 2, "drawn wire diameter (mm)" means the diameter of a wire material after execution of the wire drawing process. "Cross-sectional decrease rate" was obtained as follows: cross-sectional decrease rate=(cross-sectional area before wire drawing−cross-sectional area after wire drawing)/(cross-sectional area before wire drawing)×100%. "Average circumferential length Lc (μm)" shows a circumferential length of a perfect circle calculated by measuring the cross-sectional area of the core 4 and obtaining an average outer diameter of the core 4 based on the cross-sectional area. "Undulating peripheral length Lw" is the boundary line length of the core 4.

Table 2 shows that Lw/Lc increases with increase in the cross-sectional decrease rate of a wire material. Specifically, Table 1 shows that a processing speed ratio of about 104% or more is obtained if Lw/Lc is about 1.2 or more. Table 2 shows that a result indicating Lw/Lc of about 1.2 or more is obtained with a cross-sectional decrease rate of 80% or more. This shows that a cross-sectional decrease rate is preferably 80% or more.

As illustrated in FIG. 10, a low cross-sectional decrease rate being less than 50% (see "Working Example 21" to "Working Example 23") was confirmed to break the γ-brass layer in the outermost layer and to form a portion where the γ-brass exists and a portion where the γ-brass does not exist in a surface layer. As illustrated in FIG. 10, a moderate cross-sectional decrease rate being from 50% or more and less than 90% (see "Working Example 24" to "Working Example 32") was confirmed to form a condition where the broken γ-brass is buried in the β-brass layer. As illustrated in FIG. 10, a high cross-sectional decrease rate being 90% or more (see "Working Example 35" to "Working Example 37") was confirmed to form a condition where a portion with the densely arranged γ-brass protrudes into the β-brass thinned by the wire drawing to make the γ-brass reach the α-brass in the core 4 to be buried in the α-brass. Along with burial, a portion near the γ-brass buried densely in the α-brass bulges relatively to form the boundary surface between the core 4 and the external layer into an undulating shape.

The thickness of the β-brass layer and that of the γ-brass layer forming the electrode wire 1 according to the embodiment will be described next.

During formation of the boundary surface of the core 4 with the external layer into an undulating shape using the aforementioned mechanism, the thickness of the β-brass layer and that of the γ-brass layer should be considered. The reason for this is that, if the β-brass layer is thick and the γ-brass layer is thin, the broken γ-brass buried in the β-brass layer may not reach the core 4, failing to form the boundary surface of the core 4 with the external layer into an undulating shape.

To form the boundary surface of the core 4 with the external layer into an undulating shape, a base wire is desirably formed so as to have a thin β-brass layer and a thick γ-brass layer by adjusting a thermal processing condition for the thermal processing step executed before the wire drawing step. By forming the base wire in this way, the γ-brass is broken, and the broken γ-brass reaches the core 4 and is buried in the boundary surface of the core 4 with the external layer in the wire drawing step. As a result, the boundary surface can be formed into an undulating shape.

By doing so, the boundary surface of the core 4 with the external layer is formed into an undulating shape to achieve a large value of Lw/Lc. Further, a processing speed can be increased.

EXAMPLES

Working Examples according to the embodiment will be described below. Working Examples described below are intended to consider the aforementioned relationships between Lw/Lc and a processing speed, between the cross-sectional decrease rate of a wire material and Lw/Lc, and between the β-brass layer and the γ-brass layer before execution of the wire drawing step.

In the first step, a base wire of brass having a zinc concentration of 37 wt % was first prepared and a surface of the brass base wire was electroplated with zinc.

In the second step, a plurality of base wires was prepared. In each of these base wires, a β-brass layer was formed on a surface of the brass base wire and then a γ-brass layer was formed by means of interdiffusion action between copper and zinc under adjusted thermal processing conditions such as temperature and time. By adjusting the temperature and the time of the thermal process, a ratio between the β-brass layer and the γ-brass layer can be adjusted. The conditions such as the temperature and the time of the thermal process are not particularly limited. For example, the temperature can be set at about 800° C. and the time of the thermal process can be set to range from about 10 seconds to several tens of seconds.

Table 3 shows "base wire diameter," "β-brass layer thickness," "ratio" of a β-brass layer thickness to a base wire diameter, "γ-brass layer thickness," and "ratio" of a γ-brass layer thickness to the base wire diameter about a wire material obtained by the second step.

TABLE 3

| Base Wire No. | Base Wire Diameter | β-Brass Layer Thickness | Ratio | γ-Brass Layer Thickness | Ratio |
|---|---|---|---|---|---|
| Base Wire 1 | 0.93 mm | 15 μm | 1.6% | 44 μm | 4.7% |
| Base Wire 2 | 0.93 mm | 30 μm | 3.2% | 30 μm | 3.2% |

TABLE 3-continued

| Base Wire No. | Base Wire Diameter | β-Brass Layer Thickness | Ratio | γ-Brass Layer Thickness | Ratio |
|---|---|---|---|---|---|
| Base Wire 3 | 0.93 mm | 47 μm | 5.1% | 14 μm | 1.5% |
| Base Wire 4 | 0.93 mm | 58 μm | 6.2% | 4 μm | 0.4% |
| Base Wire 5 | 0.72 mm | 23 μm | 3.2% | 15 μm | 2.1% |
| Base Wire 6 | 0.61 mm | 19 μm | 3.1% | 12 μm | 2.0% |

In the third step, cold wire drawing was executed to obtain a wire material diameter of 0.25 mm using base wires including "base wire 1" to "base wire 6" shown in Table 3.

Then, processing speed performance and automatic wire connection performance were evaluated using the drawn electrode wires and an electrical discharge machine. The machine used for the evaluation was a wire electrical discharge machine "SX10," available from Mitsubishi Electric Corporation. Electrode wires according to "Working Example 1" to "Working Example 6" were used to process a workpiece roughly. The workpiece was made of a material SKD-11 of a thickness 50 mm.

TABLE 4

| Base Wire No. | Cross-Sectional Decrease Rate | Lw/Lc | Processing Speed Ratio | Automatic Wire Connection Ratio |
|---|---|---|---|---|
| Base Wire 1 | 93% | 1.38 | 106% | 100% |
| Base Wire 2 | 93% | 1.37 | 110% | 100% |
| Base Wire 3 | 93% | 1.35 | 109% | 100% |
| Base Wire 4 | 93% | 1.09 | 102% | 100% |
| Base Wire 5 | 88% | 1.22 | 104% | 100% |
| Base Wire 6 | 83% | 1.18 | 102% | 100% |
| Comparative Example 1 (Electrode Wire) | β-brass layer thickness 8 μm γ-brass layer thickness 8 μm | | 100% | 95% |
| Comparative Example 2 (Electrode Wire) | β-brass layer thickness 16 μm γ-brass layer thickness 8 μm | | 101% | 50% |

Table 4 shows a result of the evaluation. "Working Example 1" to "Working Example 6" shown in Table 4 correspond to "base wire 1" to "base wire 6," and are covered by the electrode wire 1 according to this invention.

Table 4 includes a result of evaluation about an "electrode wire (Comparative Example 1) having a wire material diameter of 0.25 mm and having a stack with a β-brass layer of a thickness of 8 μm and a γ-brass layer of a thickness of 8 μm," and a result of evaluation about an "electrode wire (Comparative Example 2) having a wire material diameter of 0.25 mm and having a stack with a β-brass layer of a thickness of 16 μm and a γ-brass layer of a thickness of 8 μm."

Referring to Table 4, "processing speed ratio" means a processing speed ratio relative to a processing speed according to Comparative Example 1 set at 100%. "Automatic wire connection ratio" means the ratio of the number of times a wire can be inserted relative to 100 automatic cuttings and subsequent 10 automatic insertions.

A result of the evaluation about the electrode wire 1 according to each of "Working Example 1" to "Working Example 6" shows that a processing speed increases with increase in a cross-sectional decrease rate. Specifically, regarding the base wire according to each of "Working Example 1" to "Working Example 6," a thermal processing condition is desirably adjusted in such a manner that β-brass has a layer thickness of a ratio from about 1.6 to about 6.2% relative to a base wire diameter. The thermal processing condition is also desirably adjusted in such a manner that γ-brass has a layer thickness of a ratio from about 0.4 to about 4.7% relative to the base wire diameter.

As understood from Table 4, the electrode wire 1 according to each of "Working Example 1" to "Working Example 6" achieves a higher processing speed and better automatic wire connection performance than Comparative Example 1 and Comparative Example 2. This shows that a processing speed is increased if the boundary line length Lw of the core 4 is larger than the average circumferential length Lc of the core 4. Specifically, a cross-sectional decrease rate in the wire drawing step is preferably 80% or more.

In particular, if the boundary line length Lw of the core 4 is 1.2 times greater or more than the average circumferential length Lc of the core 4, a processing speed ratio is increased remarkably to 104% or more. Thus, the boundary line length Lw of the core 4 is preferably 1.2 times greater or more than the average circumferential length Lc of the core 4.

Additionally, if the boundary line length Lw of the core 4 is 1.3 times greater or more than the average circumferential length Lc of the core 4, a processing speed ratio is increased remarkably to 109% or more. Thus, the boundary line length Lw of the core 4 is more preferably 1.3 times greater or more than the average circumferential length Lc of the core 4.

As illustrated in Table 3, regarding a relationship between the thickness of the β-brass layer and that of the γ-brass layer, "Working Example 1" corresponds to a case where the γ-brass layer is thicker than the β-brass layer (β-brass layer<γ-brass layer). Further, "Working Example 2" corresponds to a case where the γ-brass layer and the β-brass layer have the same thickness (β-brass layer=γ-brass layer), and "Working Example 3" corresponds to a case where the γ-brass layer is thinner than the β-brass layer (β-brass layer>γ-brass layer). As understood from Table 4, if the ratio of the thickness of the γ-brass layer relative to the thickness of the β-brass layer is about 0.3 or more and about less than 3.5, a processing speed ratio is increased.

Each of "Working Example 3" and "Working Example 4" corresponds to a case where the γ-brass layer is thinner than the β-brass layer (β-brass layer>γ-brass layer). Further, the ratio of the thickness of the γ-brass layer is lower in "Working Example 4" than in "Working Example 3." In this case, according to "Working Example 3," as a result of the higher ratio of the γ-brass layer, the γ-brass is buried more strongly into the core 4 to increase Lw/Lc. Thus, the result shows that a processing speed is higher in "Working Example 3" than in "Working Example 4."

EXPLANATIONS OF REFERENCE NUMERALS

1 Electrode wire (electrode wire for electrical discharge machining)
2 γ-brass (γ-brass diffused alloy)
3 β-brass (β-brass diffused alloy)
4 Core
12 Workpiece
20 Dice

The invention claimed is:
1. An electrode wire for wire electrical discharge machining comprising:
an external layer including β-brass and γ-brass; and
a core having a boundary surface with the external layer,
wherein the external layer is made up of:
(a) first regions primarily including the β-brass, in which the γ-brass is arranged sparsely, and

(b) second regions including both the β-brass and the γ-brass, in which the γ-brass is arranged densely at the boundary surface between the core and the external layer, wherein the γ-brass in the second regions is thereby concentrated within undulations in the boundary surface that extend into the core, and whereby electrical discharge is confined to the second regions including both the β-brass and the densely-arranged γ-brass.

2. The electrode wire for wire electrical discharge machining according to claim 1, wherein the core has a cross-sectional peripheral length that is 1.2 times greater or more than a circumferential length of a perfect circle calculated based on an average outer diameter of the core.

\* \* \* \* \*